Patented July 7, 1953

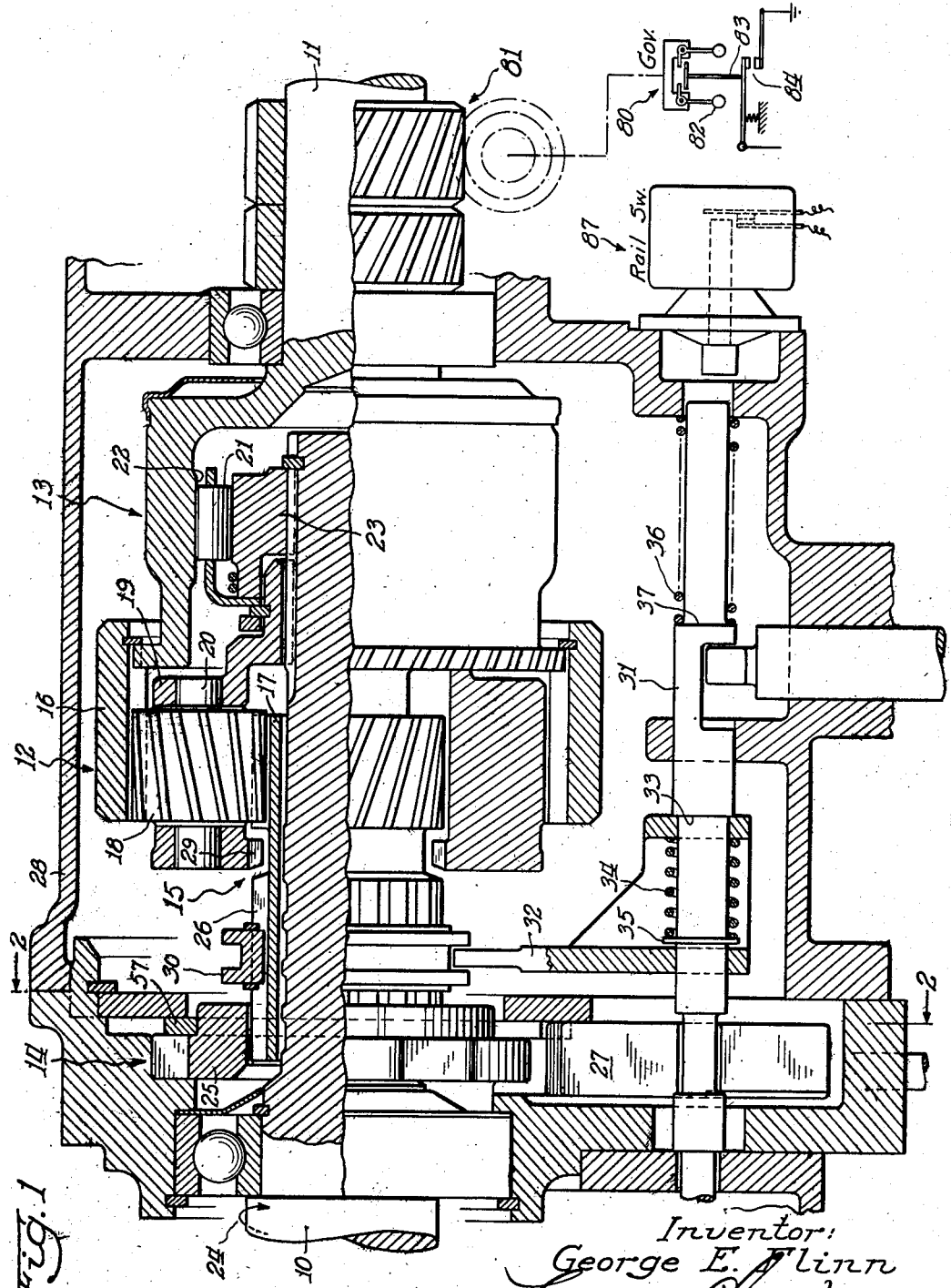

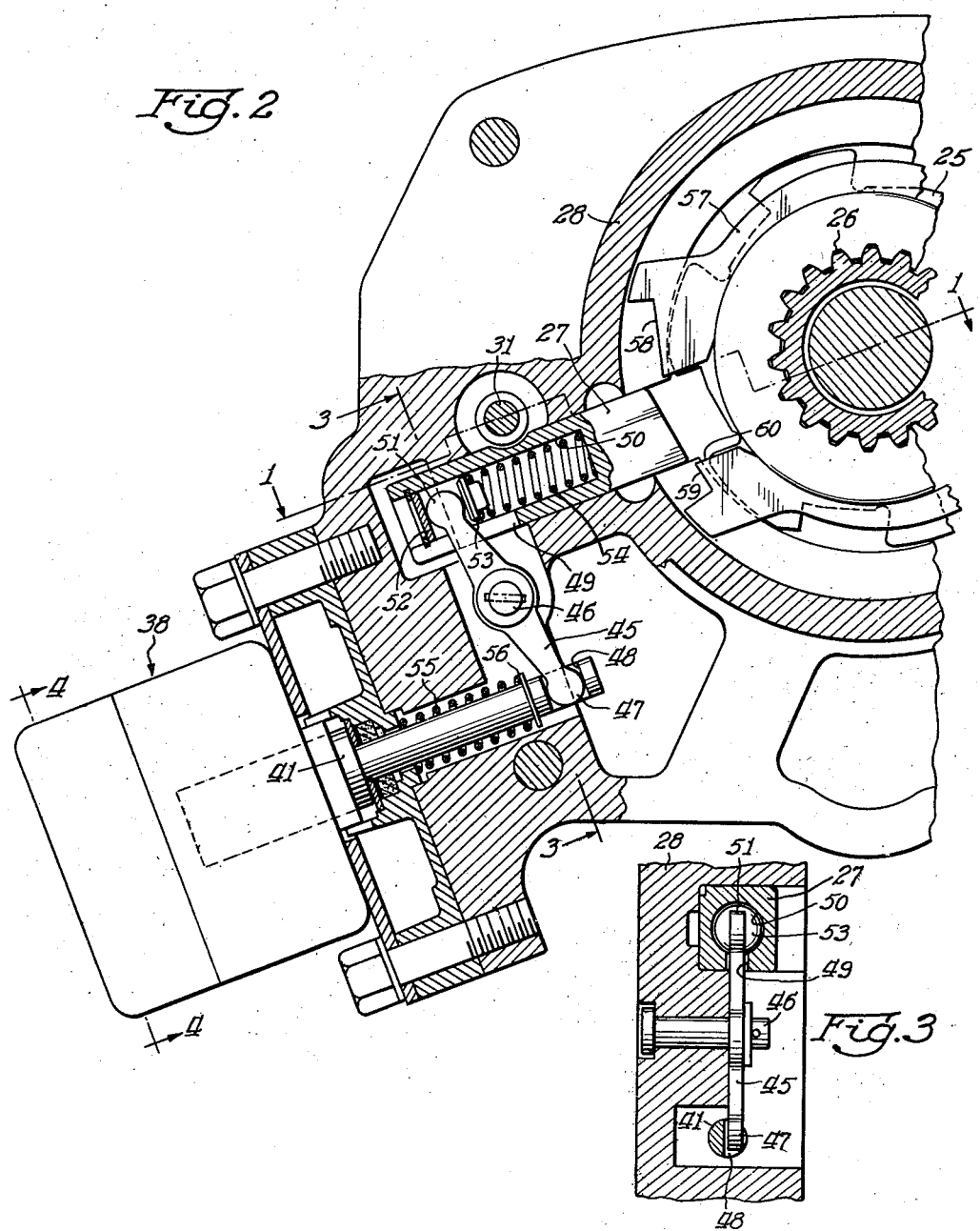

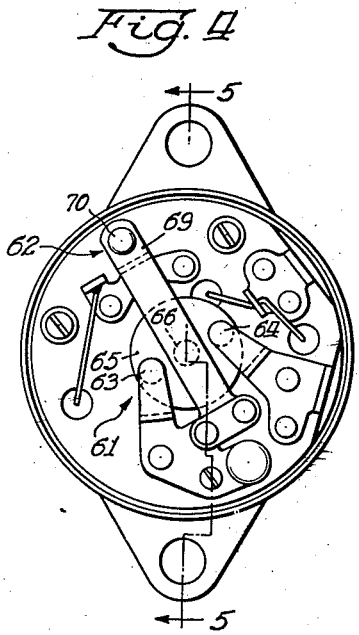
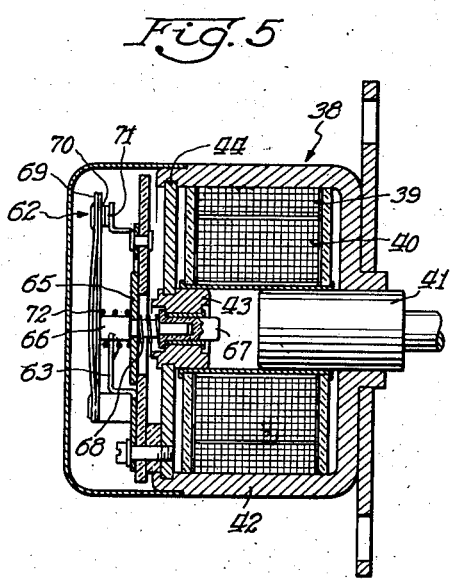
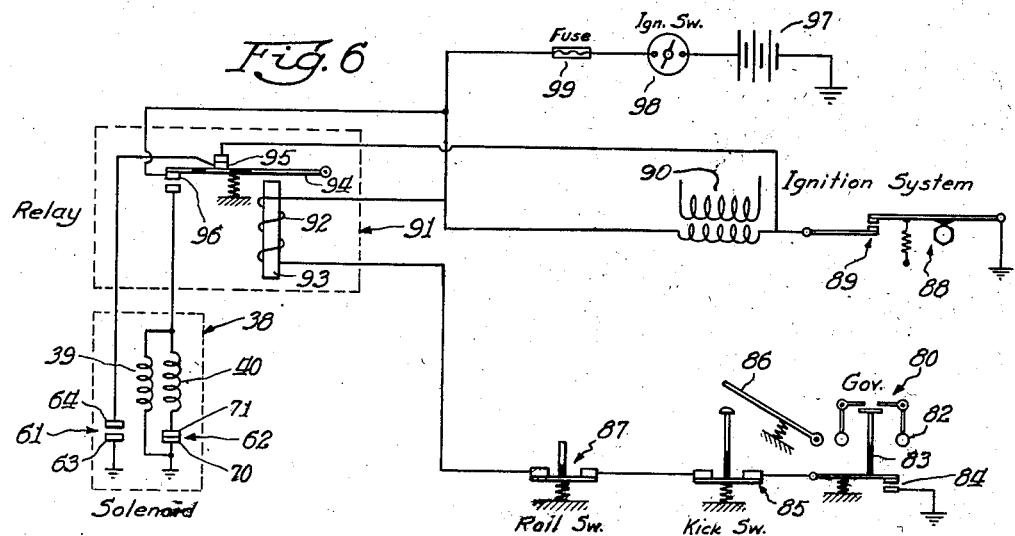

2,644,550

UNITED STATES PATENT OFFICE 2,644,550

OVERDRIVE TRANSMISSION

George E. Flinn, Muncie, Ind., assignor to Borg-Warner Corporation, Chicago, Ill., a corporation of Illinois Application December 3, 1948, Serial No. 63,413

8 Claims. (Cl. 188—163)

My invention relates to transmissions for automotive vehicles and more particularly to such transmissions which are commonly termed overdrives.

Overdrive transmissions for automotive vehicles commonly include a pawl movable into engagement with a slotted element which is connected with a reaction gear of a planetary gear set for completing an overdrive power train through the transmission. The pawl is actuated by means of an electric motor in the form of a solenoid which functions to move the pawl into engagement with the slotted element when the motor is electrically energized, and the motor generally acts directly on the pawl with a reciprocating movement of the armature of the motor being directly transmitted to the pawl to give it a corresponding movement.

Such electric solenoid motors are in general quite expensive due to complicated construction, and it is an object of my invention to provide an improved motor and connection between the motor and pawl which is relatively simple and inexpensive to manufacture.

More particularly it is an object of the invention to provide a solenoid which when energized draws its armature into the motor in a direction opposite to the engaging movement to be given the pawl and to provide lever mechanism between the solenoid armature and the pawl which will cause the pawl to move in the engaging direction on such movement of the motor armature.

The invention consists of the novel constructions, arrangements and devices to be hereinafter described and claimed for carrying out the above-stated objects and such other objects as will appear from the following description of a preferred embodiment of the invention illustrated with reference to the accompanying drawings, wherein:

Fig. 1 is a longitudinal sectional view of an overdrive transmission embodying the principles of the invention;

Fig. 2 is a sectional view taken on line 2—2 of Fig. 1;

Fig. 3 is a sectional view taken on line 3—3 of Fig. 2;

Fig. 4 is a sectional view taken on line 4—4 of Fig. 2;

Fig. 5 is a sectional view taken on line 5—5 of Fig. 4, and

Fig. 6 is a diagram of the electrical circuit used in connection with the overdrive shown in the preceding figures.

Like characters of reference designate like parts in the several views.

Referring now to the drawings, the illustrated transmission comprises generally a drive shaft 10, a driven shaft 11, a planetary gear set 12, a one-way clutch unit 13, a positive type brake 14, and a positive type clutch 15. The drive shaft 10 is adapted to be connected with the engine of the vehicle in which the transmission is installed, and the driven shaft 11 is adapted to be connected with the driving wheels of the vehicle by any suitable means.

The planetary gear set 12 comprises a ring gear 16, a sun gear 17, a plurality of planet gears 18 in mesh with the sun and ring gears and a carrier 19 for the planet gears. Each of the planet gears 18 is rotatably disposed on a pinion shaft 20 fixed in the carrier 19. The ring gear 16 is connected with the driven shaft 11, and the sun gear 17 is rotatably disposed on the drive shaft 10. The carrier 19 is splined to the drive shaft 10.

The one-way clutch unit 13 comprises a plurality of rollers 21 disposed between an internal cylindrical surface 22 formed in the driven shaft 11 and a hub 23 fixed to the drive shaft 10. The hub 23 is provided with a plurality of cams thereon (not shown), one for each of the rollers 21 so that the rollers 21 will tend to engage between the cams and cylindrical surface to provide a direct connection between the shaft 10 and driven shaft 11 when the drive shaft rotates in its normal direction of rotation as indicated by the arrow 24. The one-way clutch unit 13 is of an ordinary construction, and hence further details are not believed necessary to illustrate the unit.

The brake 14 comprises a slotted element 25 splined by means of splines 26 to the sun gear 17. A pawl 27 radially movable in a portion fixed with respect to the transmission casing 28 is provided for moving into engagement with the slotted element 25 for braking this element and for thereby holding the sun gear 17 stationary.

The clutch 15 comprises the splines 26 and teeth 29 formed on the carrier 19. The sun gear 17 is adapted to be moved axially with respect to the shafts 10 and 11 to bring the splines 26 into engagement with the teeth 29 for engaging the clutch. Movement may be imparted to the sun gear 17 for engaging or disengaging the clutch 15 by means of a collar 30 fixed on the sun gear.

A shift rail 31 is slidably disposed in the transmission casing 28 and carries a shift fork 32 thereon which is in engagement with the collar 30. The shift rail 31 is formed with a shoulder 33 against which the shift fork 32 is adapted to bear, and a spring 34 is provided between a portion of the shift fork and a washer 35 fixed to the shift rail. A spring 36 is provided between a shoulder 37 on the shift rail and a portion of the casing 28 tending to hold the shift rail in the position in which it is shown.

The illustrated transmission provides a direct drive and an overdrive between the shafts 10 and 11. With the clutch 15 and brake 14 disengaged, the one-way clutch 13 engages to provide a one-way direct drive between the shafts 10 and 11. A two-way direct drive between the shafts is provided when the clutch 15 is engaged by meshing the splines 26 with the teeth 29. The engagement of the clutch 15 has the effect of locking up the planetary unit 12 so that its parts including its gears 16, 17 and 18 and its carrier 19 rotate together as a unit. An overdrive is provided by engaging the brake 14, with the clutch 15 being disengaged. The brake 14 functions to hold the sun gear 17 stationary to render this element the reaction gear of the gear set, and the carrier 19 is driven along with the shaft 10 since it is fixed thereto, and the gearing functions to drive the ring gear 16 and thereby the driven shaft 11 fixed thereto at an overdrive or increased speed with respect to the shaft 10.

The shift rail 31 is provided for shifting the sun gear 17. The shift rail 31 when moved to the right as seen in Fig. 1 functions through the action of the spring 34 to move the splines 26 into engagement with the teeth 29, and when the shift rail 31 is moved in the opposite direction, it functions by means of its shoulder 33 bearing on the collar 32 to disengage the splines 26 with respect to the teeth 29.

The pawl 27 is moved by means of an electro-magnetic solenoid motor 38. The motor 38 comprises a pair of electric windings 39 and 40 and an armature 41 slidably disposed in the casing 42 of the motor 38. The solenoid 38 comprises also a core 43 and an annular part 44 for completing the magnetic circuit. The armature 41 is connected by means of a lever 45 with the pawl 27. The lever 45 is pivoted to a part fixed with respect to the transmission casing 28 at a point 46 and has a round end portion 47 disposed in a slot 48 in the armature 41. The lever 45 at its other end extends through a slot 49 in the pawl 27 into a cavity 50 formed in the pawl. The lever 45 has a round end portion 51 on this end which is adapted to bear on a plate 52 fixed within the pawl 27 and also on a plunger 53 slidably disposed in the cavity 50. A spring 54 is disposed between the plunger 53 and the inner end of the cavity 50 as shown. A spring 55 is disposed on the armature 41 between a washer 56 fixed on the armature and a part fixed with respect to the transmission casing 28.

An oscillatable blocker ring 57 is disposed on the slotted element 25 and is frictionally engaged therewith so as to tend to be rotated along with the slotted element. The blocker ring 57 comprises ledges 58 and 59 against which the pawl 27 may rest and is broken to provide a slot 60 through which the pawl 27 may move.

Upon energization of the electro-magnetic motor 38, by energization of its windings 39 and 40, the armature 41 is drawn into the motor 38 against the action of the spring 55 so as to rotate the lever 45 about its pivotal connection 46. The end 51 of the lever 45 moves so as to tend to cause a radially inward movement of the pawl through the intermediary of the plunger 53 and the spring 54. Assuming that the blocker ring 57 is rotated in a counter-clockwise direction from its position as shown in Fig. 2 so that the ledge 58 is in the path of movement of the pawl 27, the pawl will move on to the ledge 58 and further movement of the pawl will be blocked, and additional movement of the lever 45 along with the armature 41 will cause movement of the plunger 53 within the cavity 50 against the action of the spring 54. The spring 54 is thus cocked so as to cause a further movement of the pawl 27 into engagement with the slotted element 25 when the blocker 57 is rotated in the clockwise direction as seen in Fig. 2 to bring its ledge 58 out of line of movement of the pawl 27 and to bring its slot 60 into register with the line of movement of the pawl. Such movement of the blocker ring 57 is brought about when the speed of the drive shaft 10 is decreased with respect to the speed of the driven shaft 11 with an accompanying overrunning of the one-way clutch 13, assuming the vehicle has previously been driven in direct drive through the one-way clutch 13 so as to reduce the speed of rotation of the slotted element 25 until finally the slotted element comes to rest and reverses its direction of rotation to a slight degree. The pawl 27 may then move into engagement with the slotted element 25, so that the brake 14 is engaged and the transmission is in overdrive ratio.

The solenoid motor 38 comprises two switches 61 and 62. The switch 61 comprises contacts 63 and 64 adapted to be bridged by means of a disc 65 slidably disposed on a plunger 66. The plunger 66 is fixed with respect to a plunger 67 which is slidably disposed in the core 43. A spring 68 is disposed on the plunger 66 between the plunger 67 and the disc 65 as shown. The switch 62 comprises a spring contact arm 69 and contacts 70 and 71. The plunger 66 contacts the arm 69 and a spring 72 is disposed between the disc 65 and the arm 69.

The switch 62 is closed and the switch 61 is open when the motor 38 is in its deenergized condition, such as it is, for example, shown in Fig. 5. When the windings 39 and 40 are energized, the armature 41 is drawn within the windings so as to move the pawl 27 radially inwardly as has been described, and the armature 41 when so moved contacts the plunger 67 and through the intermediary of the spring 68 moves the disc 65 outwardly so as to bridge the contacts 63 and 64 to thereby close the switch 61. The switch 62 is opened by this movement of the armature through the intermediary of the plungers 67 and 66, as is apparent. The spring 68 functions in this connection to yieldably hold the disc 65 against the contacts 63 and 64.

The electric motor 38 is controlled by means of the electric system shown in Fig. 6. This system comprises a governor 80 of any suitable construction which is driven through the intermediary of gearing 81 by the driven shaft 11. The governor may comprise pivoted weights 82 acting on a plunger 83 which in turn acts on a switch 84 to close the switch when the governor and shaft 11 rotate above predetermined speeds. The switch 84 is connected in series with a kickdown switch 85 that is controlled by the accelerator 86 of the vehicle. The accelerator 86 is connected with the throttle of the vehicle engine (not shown) in the usual manner so that when the accelerator is depressed the vehicle throttle is opened, and the accelerator is adapted to act on the kickdown switch 85 so as to open the switch when the accelerator is moved to an open throttle position.

A rail switch 87 is connected in series with the switches 84 and 85, and this switch is controlled by means of the shift rail 31 (see Fig. 1) so that the switch 87 is opened when the rail 31 is moved to the right as seen in Fig. 1 to engage the lockup clutch 15.

The electric system includes the ordinary ignition system of an internal combustion vehicle engine. This system includes the usual interrupter 88 comprising the switch 89 which is connected in series with the usual ignition coil 90.

The electric system includes a relay 91 which comprises a winding 92 on a magnetizable core 93. A pivoted armature 94 is provided that is adapted to be drawn to the core 93 when the core is energized, and this armature carries switch contacts 95 and 96, adapted to cooperate with corresponding stationary switch contacts 95 and 96 respectively.

The electric system is connected with the usual vehicle battery 97, the ignition switch 98 and a fuse 99 in series with the ignition switch.

As is apparent from an inspection of the figure, the switches 84, 85, 87 and the winding 92 are connected in series with each other and with the ignition switch 98 and battery 97. The winding 40 is connected in series with the switch 62, the contacts 96, and with the ignition switch and battery. The winding 39 is connected in parallel with the winding 40 and switch 62. The contacts 95 and switch 61 are connected with the ignition system, which includes the ignition coil 90 and interrupter switch 89, to a point between the coil 90 and switch 89. The ignition system is connected through the fuse 99 to the ignition switch 98 as shown.

Below the critical governor speed, the winding 92 is deenergized, since the switch 84 is open. When the critical governor speed is reached which corresponds to a certain vehicle speed, the contacts close, and the circuit through the winding 92 is completed and the relay 91 is energized. Such energization causes the armature 94 to move to open the contacts 95 and close the contacts 96. Closure of the contacts 96 causes an energization of the windings 39 and 40 of the electro-magnetic motor 38. Such energization of the windings 39 and 40 causes the armature 41 of the motor 38 to be drawn inwardly of the motor and causes the pawl 27 to be moved toward the slotted element 25. During ordinary driving, the blocker ring 57 is positioned with its ledge 58 in the line of movement of the pawl 27 so that the pawl is blocked. During this movement of the armature 41, with the pawl being blocked, the plunger 53 is moved in the cavity 50 and the spring 54 is compressed.

With the parts being in these conditions, the vehicle driver may release the accelerator 86 to decrease the speed of the drive shaft 10 with respect to the driven shaft 11, and the slotted element 25 and sun gear 17 will decrease in speed with decrease in speed of the drive shaft 10 until eventually the sun gear 17 and slotted element will stop and will reverse their direction of rotation. Upon this reversal, the blocker ring 57 is moved into its position in which it is illustrated in Fig. 2 with its slot 60 in the line of movement of the pawl 27, and the pawl 27 will complete its stroke and engage the slotted element 25. The transmission is then in overdrive.

The armature 41 when it is moved inwardly in the motor 38 moves against the plunger 67 and moves the disc 65 into engagement with the contacts 63 and 64 to close the switch 61. The plunger 66 is moved by the plunger 67 and abuts against the contact arm 69 to open the contacts 70 and 71 for opening the switch 62. The switch 62 is in series with the winding 40, and thereby breaks the circuit through this winding, so that only the winding 39 is effective to hold the armature 41 in its energized position within the motor 38. The winding 39 is sufficient for this purpose and draws a comparatively small current compared to the two windings in parallel.

The transmission may be downshifted from overdrive ratio to direct ratio by moving the accelerator 86 to an open throttle position to open the switch 85. Opening the switch 85 has the effect of breaking the circuit through the winding 92 and thereby deenergizing the relay 91. The armature 94 thereupon returns to its original position in which it is illustrated in Fig. 6 in which the contacts 95 are closed and contacts 96 are open. Opening of the contacts 96 has the effect of breaking the circuit through the winding 39 and the spring 55 is thereupon effective to tend to move the pawl 27 to its inoperative position in which it is illustrated in Fig. 2, the rounded end 51 of the lever 45 acting on the plate 52 within the pawl. Since the throttle of the vehicle is open, however, the slotted element 25 bears on the pawl 27 and prevents its withdrawal from the slotted element unless some means is provided for breaking the torque delivered by the engine.

I provide means for breaking the torque through the transmission for this purpose, which includes the switch 61 and contacts 95 connected with the ignition coil 90. When both the switch 61 and contacts 95 are closed, the ignition circuit is grounded, and the torque delivered by the engine is interrupted, and the spring 55 is thereupon effective to withdraw the pawl 27 from the slotted element 25. The transmission is then again in direct drive with the transmission of power being through the one-way clutch 13. As has been explained, the switch 61 is closed when the armature 41 is in its energized position, and the contacts 95 close immediately upon deenergization of the relay 91 which occurs when the switch 85 is opened.

The rail switch 87 is connected in series with the switches 84 and 85 as described, and its purpose is to prevent an upshift into overdrive in the transmission when the rail 31 is in its shifted position to engage the clutch 15. When the rail 31 is shifted to the right as seen in Fig. 1, the switch is opened for this purpose. As will be readily understood, an engagement of the clutch 15 which provides a two-way direct drive and a simultaneous engagement of the pawl 27 which provides a two-way drive in overdrive speed ratio would have disastrous effects on the parts of the transmission.

My improved transmission arrangement advantageously provides a simple connection between the electric solenoid motor 38 and the pawl 27. The arrangement allows a solenoid 38 of the pull-type to be utilized for pushing the pawl 27 inwardly upon energization of the motor, and the use of the more complicated and expensive push-type solenoid for directly producing this result is obviated.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. An overdrive control mechanism comprising in combination a sun gear locking pawl, said pawl being longitudinally movable into engagement with the sun gear, a pull-type solenoid having an armature, a lever pivoted at a central point and having a connection at one end with said armature and having a connection at the other end with said pawl whereby actuation of the solenoid causing retracting movement of the armature will cause movement of said pawl into engagement with the sun gear, said connection of said lever and said pawl comprising a spring whereby said armature may be retracted without corresponding movement of said pawl, and a spring for returning said pawl, lever and armature back to their inoperative positions.

2. In a mechanism for braking a rotatable slotted member, a reciprocable pawl movable longitudinally into a slot in the slotted member for stopping rotation thereof, a reciprocable armature, a pull-type solenoid for actuating said armature, a first class lever interconnecting said armature and said pawl, said solenoid being effective upon energization thereof for retracting said armature and pivoting said lever to thereby move said pawl towards the slotted member, and means effective upon deenergization of said solenoid for moving said armature to thereby withdraw said pawl from the slotted member.

3. In a mechanism for braking a slotted member, a reciprocable pawl movable longitudinally into a slot in the slotted member for braking the member, a reciprocable armature having operative and inoperative positions, a pull-type solenoid for moving said armature to said operative position upon energization of the solenoid, a pivotally mounted lever interconnecting said armature and pawl, said armature being effective upon movement to said operative position for pivoting said lever to thereby move said pawl into engagement with the slotted member, and a compression spring continually urging said pawl towards its said inoperative position and effective upon deenergization of said solenoid for so moving said armature and thereby pivoting said lever and withdrawing said pawl from the slotted member.

4. In a mechanism for braking a slotted member, a reciprocable pawl movable longitudinally into a slot in the slotted member for braking the member, a reciprocable armature having operative and inoperative positions, a solenoid for moving said armature to said operative position upon energization of the solenoid, a pivotally mounted lever interconnecting said armature and pawl, said armature being effective upon movement to said operative position for pivoting said lever to thereby move said pawl into engagement with the slotted member, a compression spring continually urging said pawl towards its said inoperative position and effective upon deenergization of said solenoid for so moving said armature and thereby pivoting said lever and withdrawing said pawl from the slotted member, and a manually operable member for holding said pawl stationary and thereby preventing the engagement of said pawl with the slotted member upon energization of said solenoid.

5. In a mechanism for braking a slotted member, a reciprocable pawl movable longitudinally into a slot in the slotted member for braking the slotted member, a rectilinearly movable armature, a solenoid for retracting said armature rectilinearly into an operative position, a pivotally mounted lever having one end connected to said armature, yieldable means connecting the other end of said lever with said pawl, said armature being effective upon energization of said solenoid to move said lever and bias said yieldable means, said yieldable means being effective upon being biased by said armature to cause engagement of said pawl in a slot in the slotted member, and spring means for moving said armature rectilinearly into an inoperative position upon deenergization of said solenoid, whereby said pawl is withdrawn from the slot in the slotted member.

6. In a mechanism for braking a slotted member, a reciprocable pawl movable longitudinally into a slot in the slotted member for braking the slotted member, a rectilinearly movable armature, a solenoid for moving said armature rectilinearly into an operative position, a pivotally mounted lever having one end connected to said armature, yieldable means connecting the other end of said lever with said pawl, said armature being effective upon energization of said solenoid to move said lever and bias said yieldable means, said yieldable means being effective upon being biased by said armature to cause engagement of said pawl in a slot in the slotted member, a compression spring for moving said armature rectilinearly into an inoperative position upon deenergization of said solenoid to thereby withdraw said pawl from the slot in the slotted member, and a manually operable member for holding said pawl stationary and thereby preventing the engagement of said pawl with the slotted member upon energization of the solenoid.

7. In a mechanism for braking a slotted member, a reciprocable pawl movable longitudinally into a slot in the slotted member for braking the slotted member, a rectilinearly movable armature, a solenoid for retracting said armature rectilinearly into an operative position, a pivotally mounted lever having one end connected to said armature, yieldable means connecting the other end of said lever with said pawl, said armature being effective upon energization of said solenoid to move said lever and bias said yieldable means, synchronizing means for synchronizing said pawl with a slot in the slotted member, said yieldable means being effective upon being biased by said armature when said pawl is synchronized with the slot in the slotted member for causing engagement of said pawl in the slot in synchronism therewith, and spring means for moving said armature rectilinearly into an inoperative position upon deenergization of said solenoid, whereby said pawl is withdrawn from the slot in the slotted member.

8. In a mechanism for braking a slotted member, a reciprocable pawl movable longitudinally into a slot in the slotted member for braking the slotted member, a rectilinearly movable armature, a solenoid for moving said armature rectilinearly into an operative position, a pivotally mounted lever having one end connected to said armature, yieldable means connecting the other end of said lever with said pawl, said armature being effective upon energization of said solenoid to move said lever and bias said yieldable means, synchronizing means for synchronizing said pawl with a slot in the slotted member, said yieldable means being effective upon being biased by said armature when said pawl is synchronized with the slot in the slotted member for causing engagement of said pawl in the slot in synchronism therewith, spring means for moving said armature rectilinearly into an inoperative position upon deenergization of said solenoid for thereby withdrawing said pawl from the slot in the slotted member, and a manually operable member for holding said pawl stationary and thereby preventing the engagement of said pawl with the slotted member upon energization of the solenoid.

GEORGE E. FLINN.

References Cited in the file of this patent

UNITED STATES PATENTS

| Number | Name | Date |
|---|---|---|
| 665,450 | Mahoney | Jan. 8, 1901 |
| 1,077,984 | Irwin | Nov. 11, 1913 |
| 2,201,118 | Beede | May 14, 1940 |
| 2,254,115 | Claytor | Aug. 26, 1941 |
| 2,319,226 | Griswold et al. | May 18, 1943 |
| 2,330,407 | Claytor | Sept. 28, 1943 |
| 2,334,402 | Flinn | Nov. 16, 1943 |
| 2,339,967 | Vincent | Jan. 25, 1944 |
| 2,404,980 | Munschauer | July 30, 1946 |
| 2,445,561 | Carnagua | July 20, 1948 |